Patented Dec. 21, 1937

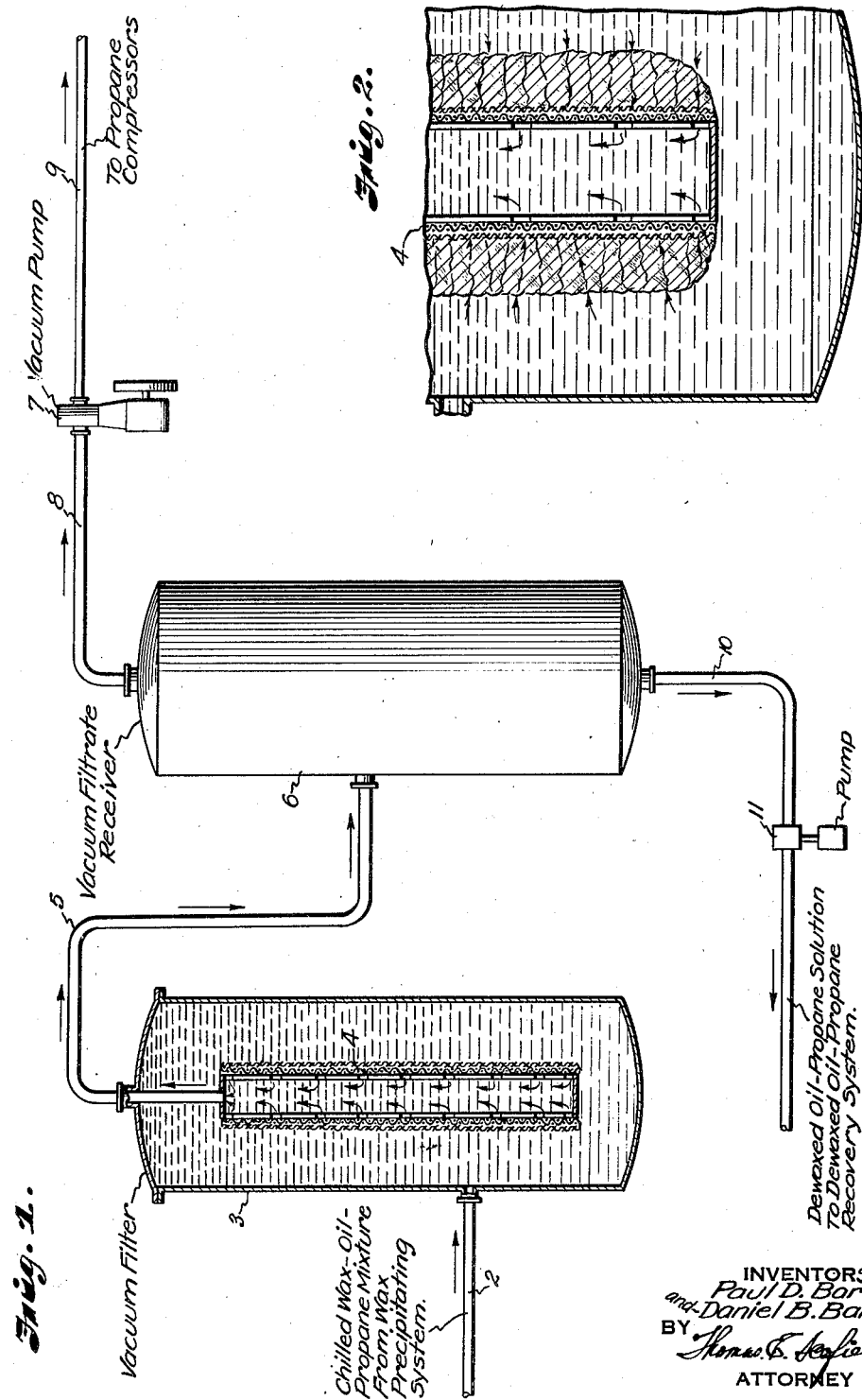

2,102,828

UNITED STATES PATENT OFFICE 2,102,828

METHOD OF DEWAXING HYDROCARBON OILS

Paul D. Barton, Scarsdale, N. Y., and Daniel B. Banks, Upper Darby, Pa., assignors, by mesne assignments, to Sun Oil Company, Philadelphia, Pa., a corporation of New Jersey Application April 16, 1934, Serial No. 720,730

5 Claims. (Cl. 196—18)

Our invention relates to the dewaxing of hydrocarbon oils, and more particularly, to a method of separating finely divided crystalline and amorphous wax from a chilled mixture of wax and a solution of oil in a normally gaseous hydrocarbon solvent.

It has been found that in certain types of wax bearing distillates, particularly of the lighter fractions, or where light fractions predominate, that by normal chilling fractional crystallization takes place. This is typical of a long residue stock or a long distillate which carries the entire or combined waxes of the crude. These waxes are normally segregated into fractions so that the lighter fraction will carry the crystalline waxes which are pressable, and the heavier fractions of more viscous oil waxes which are centrifuged.

When the entire lubricating oil-wax portion of the crude is segregated and partially decolorized by removing some of the heavy asphaltic material (either by vacuum distillation or by treating), blended with a diluent and chilled, it will be found that fractional crystallization takes place to the extent that so much of the crystalline type waxes are precipitated that the entire solution becomes a thick slurry due to the interlocking effect of the crystalline wax on the entire mass. This increased viscosity makes it difficult to crystallize the more amorphous waxes.

This can be done by two methods; first, by two stage dewaxing, i. e. removing the crystalline wax at a proper predetermined temperature either by treating and removing with sludge, or by filtering. This will make it possible to precipitate the balance of the wax, i. e. the amorphous type, at temperatures of, say —45° to —50° F. The second method is to chill the entire mixture to a very low temperature, say —65° F. and then filter the entire mass under pressure.

It has been found that either method will give the same results as to cold test and wax removal.

The ordinary pressure system of filtration depends for its operation on the mechanical establishment of pressure on the liquid at the upstream side of the filter. This pressure may be considerably above the vaporization equilibrium pressure of the mixture to be filtered at the temperature which exists at the upstream side. It will be observed that there will be formed on the filter leaves a series of layers of solidified wax-like compounds. The operation of the filters in such a pressure system is accompanied by a continuous flow of heat from the exterior of the units to the oil wax solvent contained therein. This is normally substantially overcome by counterflow of cold material derived from the mixture being filtered. As the wax cake builds up on the filter leaves, there is a gradual decrease in the rate of flow of the filtrate which is utilized for cooling until the amount is insufficient to absorb the characteristic amount of heat flowing in continuously from the exterior. During the refrigeration of the oil solvent solution, each stage of temperature reduction will result in a new series of wax-like compounds being crystallized. Similarly, during the filtration, as the temperature of the wax cake increases due to inadequate cooling, there will be a progressive re-dissolving of the lower melting series of wax-like compounds in the wax cake by the filtrate. The result will be a gradual raising of the cold test of the filtrate as well as a gradual softening of the lower melting point series of wax compounds accumulated on the filter leaves. This softening will ultimately tend to render the cake substantially impervious thus blocking the flow of wax free oil through the filters. In such case early shutting down of the filter unit for cleaning of the leaves is necessitated before operation can be resumed. This results in loss of time, uneconomical operation, and general lack of feasibility from a commercial standpoint. An improved method of carrying out the low temperature method has been found by combining the temperature reduction, the solidification of the lower melting waxes, and the filtration into one operation.

It is a salient object of our invention to provide a method of separating a finely divided crystalline wax from a mother solution containing substantial amounts of a normally gaseous hydrocarbon for the production of a substantially wax free oil.

It is a further object of our invention to provide a method of separating the finely divided crystalline wax from a mother solution containing substantial amounts of a normally gaseous hydrocarbon which will produce a liquid pervious filter cake without the addition of any other material such as a comminuted solid or filter aid.

It is another object of our invention to provide a process for separating a finely divided crystalline wax from a mother solution containing substantial amounts of a normally gaseous hydrocarbon which will prevent softening of the low melting point wax in the filter cake (with resulting loss in permeability) through the conduction of heat from the outside.

It is still another object of our invention to provide a process for separating a finely divided crystalline wax from a mother solution containing substantial amounts of a normally gaseous hydrocarbon which will secure a rapid and efficient rate of operation of the separating units.

Other and further objects of our invention will appear from the following description and the appended claims.

In the accompanying drawing which forms part of the instant specification and is to be read in conjunction therewith and in which like numbers refer to like parts throughout the several views:

Figure I is a schematic showing of one form of apparatus capable of carrying out the process of our invention.

Figure II is an enlarged detailed view of a section of the filter unit of Figure I.

In general, a chilled mixture of finely divided crystalline wax and a solution of oil in a substantial amount of a normally gaseous hydrocarbon solvent is delivered to a filter unit. The normally gaseous hydrocarbon we shall refer to hereinafter as propane although it is to be understood that propane, butane, isobutane, alone or in combination, are to be considered within the category of this term. It is of primary importance that the mixture delivered to the filter unit shall be at substantially vaporization equilibrium for the temperature and pressure conditions existing with respect to the mixture. The downstream side of the filter element or elements proper is connected to a receiver having a vapor space therein maintained at a pressure less than the pressure existing on the mixture at the upstream side of the filter unit.

Referring now more particularly to Figure I, a feed line 2 is connected to the vessel 3 which serves to hold the mixture to be filtered. Suitably supported within the vessel 3 is a filter element 4 of the ordinary canvas and wire screen type, the upper or downstream side of which is connected by means of a line 5 to a receiving vessel 6. It is to be understood, however, that this is by way of example only and any other suitable filter such as a capillary film mesh type Hele-Shaw or a rotary filter may be substituted therefor. A vacuum pump 7 is connected at its suction side by means of a vapor line 8 to the upper part of the vessel 6. The pressure side of the pump 7 may be connected by means of the discharge line 9 to other compressors not shown. The vessel 6 is also provided with a withdrawal line 10 having a pump 11 for removing the liquid which accumulates in the vessel.

An example of the operation of our process is as follows:

A mixture or slurry of finely divided crystalline wax and solution of oil in a normally gaseous hydrocarbon solvent such as propane is delivered through the line 2 to the vessel 3. This mixture will be substantially at temperature and pressure vaporization equilibrium. A solution of oil in propane passes through the canvas and wire screen into the interior of the filter element 4, leaving on the surface of the canvas a deposit of finely divided solidified wax. The filtrate within the filter element 4 passes through the line 5 to the receiver 6 which is permitted to become only partially filled. A suction is applied to the space above the liquid body by means of the pump 9 acting through the line 8 thereby creating a reduction in pressure above the surface of the liquid body which communicates through the line 5 to the interior of the filter element 4. The canvas screen or whatever filter medium is used must be fine enough to retain the solidified wax only. This deposit or cake of wax immediately becomes a part of the filter medium and serves as a filter aid. A pressure drop will exist across the cake. This will cause vaporization of some of the solvent which, in turn, causes a definite temperature drop resulting in further crystallization of lower melting point waxes. The vapors evolved by pressure reduction penetrate the cake and keep it open and porous for the filtrate to flow through. After the cake has become sufficiently thick it may be scraped off. It will be seen that the temperature drop due to vaporization of the hydrocarbon solvent within the filter cake not only serves to precipitate, or solidify, the lower melting point waxes therein but also serves to harden the previously solidified wax and maintain the wax cake as a firm cellular structure on the filter element.

The filtrate which accumulates in the receiver 6 may be withdrawn by the pump 11 through the line 10 and delivered to distillation apparatus for the recovery of the propane contained in the oil. The propane vapors delivered from the vacuum pump 7 through the line 9 may be delivered to compressors (not shown) for recovery and re-use.

It will be observed that we have accomplished the objects of our invention and have provided a method for recovering substantially wax-free oil without using a comminuted solid to assist filtration and are enabled to maintain a commercially efficient rate of operation of the wax separating unit.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Instead of scraping the cake off the filtering medium, it may be removed by washing with solvent or by any other suitable means. One method of removing the filter cake is shown in our copending application Serial No. 733,022, filed June 29, 1934.

Having thus described our invention, what we claim is:

1. A method of separating finely divided wax from a chilled mixture of solidified wax and a solution of oil in a normally gaseous hydrocarbon solvent, the mixture being substantially at vaporization equilibrium for the temperature and pressure existing in the mixture, comprising introducing the mixture to a filtering zone and maintaining a sub-equilibrium pressure on the eduction side of the filtering zone such as will cause vaporization of enough solvent in the oil-solvent solution passing through said filtering zone to further lower the temperature and precipitate additional wax in the oil.

2. A dewaxing process comprising introducing to a filtering zone a mixture of solidified wax and a solution of oil in a normally gaseous hydrocarbon solvent, said mixture being at substantially vaporization equilibrium for the temperature and pressure existing in the mixture, filtering the wax from the mixture, removing wax-free oil solution from the eduction side of the filtering zone, introducing the wax-free oil solution to a receiving zone and maintaining said receiving zone and the eduction side of said filtering zone at a subequilibrium pressure such as will cause vaporization of enough solvent in the oil-solvent solution passing through said filtering zone to further lower the temperature and precipitate additional wax.

3. A process of dewaxing a solution of wax bearing oil in a normally gaseous hydrocarbon solvent, the solution having been chilled to produce a mixture of finely divided crystalline wax and a solution of oil in the solvent at substantially vaporization equilibrium for the temperature and pressure in the mixture, comprising flowing the mixture against a filter medium, forming a wax cake on the medium, establishing a pressure drop through the wax cake and filter medium in the direction of flow sufficient to cause evaporation of enough solvent in the oil-solvent solution passing through said cake and filter medium as to lower the temperature of the solution sufficiently to precipitate further wax from the oil and harden the cake, and removing a substantially wax-free oil solution from the eduction side of the filter medium.

4. A method of removing crystalline and lower melting point waxes from a hydrocarbon oil which has been diluted with a normally gaseous hydrocarbon solvent and chilled to precipitate crystalline wax in the oil comprising flowing the mixture of precipitated wax and oil-diluent solution at substantially vaporization equilibrium for the temperature and pressure in the mixture through a filter medium whereby a cake of solidified wax is deposited on the medium, establishing a pressure drop through the wax cake and filter medium in the direction of flow sufficient to cause evaporation of enough solvent in the oil-solvent solution passing through said cake and filter medium as to lower the temperature of the solution sufficiently to cause lower melting point waxes in the oil to precipitate therefrom within the cake and removing a substantially wax-free oil solution from the eduction side of the filter medium.

5. A method of removing wax from a hydrocarbon oil which has been diluted with a normally gaseous hydrocarbon solvent and chilled to precipitate crystalline wax comprising flowing the mixture at substantially vaporization equilibrium for the temperature and pressure existing in the mixture against a filter medium, forming a cake of solidified wax on the medium, establishing a pressure drop through the wax cake and filter medium in the direction of flow sufficient to cause evaporation of enough solvent in the oil-solvent solution passing through said cake and filter medium as to form innumerable filter-aid oil passages in the cake and lower the temperature of the solution sufficiently to solidify further wax like compounds of lower melting point in the oil and removing a substantially wax-free oil solution from the eduction side of the filter medium.

PAUL D. BARTON.
DANIEL B. BANKS.